(12) United States Patent
Goel et al.

(10) Patent No.: US 8,312,365 B2
(45) Date of Patent: Nov. 13, 2012

(54) RENDERING WEB CONTENT WITH A BRUSH

(75) Inventors: Pranav Goel, Seattle, WA (US); David P. Relyea, Bellevue, WA (US); Marco A. Matos, Seattle, WA (US); Chris J. Crosetto, Redmond, WA (US); Christopher R. Kempke, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 101 days.

(21) Appl. No.: 12/813,507

(22) Filed: Jun. 11, 2010

(65) Prior Publication Data

US 2011/0307809 A1 Dec. 15, 2011

(51) Int. Cl.
*G06F 17/00* (2006.01)
*G06F 17/20* (2006.01)

(52) U.S. Cl. ........ 715/205; 715/208; 715/234; 715/239; 715/275

(58) Field of Classification Search .................. 715/760, 715/205, 208, 234, 239, 275
See application file for complete search history.

(56) References Cited

U.S. PATENT DOCUMENTS

| | | | | |
|---|---|---|---|---|
| 6,091,411 A * | 7/2000 | Straub et al. | | 715/747 |
| 6,373,490 B1 * | 4/2002 | Bendiksen et al. | | 345/441 |
| 6,859,909 B1 * | 2/2005 | Lerner et al. | | 715/203 |
| 7,154,503 B2 * | 12/2006 | Yuan | | 345/553 |
| 7,409,633 B2 | 8/2008 | Lerner et al. | | |
| 7,924,284 B2 * | 4/2011 | Ewanchuk et al. | | 345/443 |
| 7,949,935 B2 * | 5/2011 | Friedman et al. | | 715/205 |
| 7,966,558 B2 * | 6/2011 | Duncan et al. | | 715/243 |
| 2002/0015064 A1 * | 2/2002 | Robotham et al. | | 345/863 |
| 2004/0194020 A1 * | 9/2004 | Beda et al. | | 715/502 |
| 2004/0257346 A1 * | 12/2004 | Ong et al. | | 345/179 |
| 2005/0270311 A1 * | 12/2005 | Rasmussen et al. | | 345/677 |
| 2006/0010374 A1 | 1/2006 | Corrington et al. | | |
| 2006/0031755 A1 * | 2/2006 | Kashi | | 715/512 |
| 2006/0053411 A1 | 3/2006 | Takamiya | | |
| 2006/0084039 A1 * | 4/2006 | Ryokai et al. | | 434/155 |
| 2006/0242349 A1 * | 10/2006 | Ewanchuk et al. | | 710/305 |
| 2009/0077472 A1 * | 3/2009 | Bonforte | | 715/753 |
| 2010/0079474 A1 * | 4/2010 | Sridharanarayanan et al. | | 345/553 |
| 2010/0083146 A1 * | 4/2010 | Hasuike et al. | | 715/760 |
| 2011/0004887 A1 * | 1/2011 | Stringer et al. | | 719/328 |

(Continued)

OTHER PUBLICATIONS

Cavalli, Corrado., "Silverlight 4.0: What's New", Retrieved at <<http://www.codeworks.it/public/docs/Silverlight4eng.pdf >>, Retrieved Date: Feb. 25, 2010, pp. 1-14.

(Continued)

*Primary Examiner* — Steven B Theriault
(74) *Attorney, Agent, or Firm* — Boswell IP Law; J. Mason Boswell

(57) ABSTRACT

A content display system is described herein that combines the positive attributes of brushes and web content by allowing web content to be applied as a brush. The content display system renders web content and creates a bitmap of the rendered web content. The bitmap of the web content as rendered by a web host is captured and used as the pixels for a web brush. The brush can be used wherever other types of brushes can be used. In some embodiments, the brush content is refreshed under control of the application. Web content provided through a brush is much more versatile than simply compositing rendered HTML with other visuals. Thus, the content display system allows applications to display web content inside an application sandbox or other platform using the familiar form to application developers of a brush.

20 Claims, 4 Drawing Sheets

U.S. PATENT DOCUMENTS

| | | | | |
|---|---|---|---|---|
| 2011/0047506 A1* | 2/2011 | Miller | | 715/808 |
| 2011/0099467 A1* | 4/2011 | Kapur et al. | | 715/236 |
| 2011/0102457 A1* | 5/2011 | Bhatt et al. | | 345/619 |
| 2011/0307808 A1* | 12/2011 | Giambalvo et al. | | 715/760 |
| 2011/0307809 A1* | 12/2011 | Goel et al. | | 715/760 |

OTHER PUBLICATIONS

Boschin, Andrea., "Five Silverlight 4.0 Features you Cannot do Without", Retrieved at <<http://www.silverlightshow.net/items/Five-Silverlight-4.0-features-you-cannot-do-without.aspx >>, Nov. 27, 2009, pp. 4.

Ducasse, et al., "Seaside: A Flexible Environment for Building Dynamic Web Applications", Retrieved at <<http://ieeexplore.ieee.org/stamp/stamp.jsp?tp=&arnumber=4302687 >>, IEEE Software, vol. 24, No. 5, Sep. 2007, pp. 56-63.

"Silverlight 4 Debuts with Killer Demos at PDC09", Retrieved at <<http://www.nikhilk.net/Silverlight4-Killer-Demos-At-PDC09.aspx >>, Nov. 18, 2009, pp. 5.

Logicchild., "Using Brushes and Transparency in Silverlight", Retrieved at <<http://www.codeproject.com/KB/silverlight/Expression_Blend.aspx >>, Dec. 17, 2009, pp. 11.

"Awesomium", Retrieved at <<http://princeofcode.com/awesomium.php >>, Retrieved Date: Feb. 25, 2010, pp. 3.

* cited by examiner

RENDERING WEB CONTENT WITH A BRUSH

BACKGROUND

In computer graphics rendering systems, applications use brushes to paint the foreground, background, or other properties of visual elements. A brush typically defines a color or pattern that the system can apply or repeat in an area that the system is painting. For example, if a user removes a window that was previously covering another window, the system may repaint the previously obscured window or a portion of the window that was obscured, using a currently active brush. Examples of brushes include those made of solid colors, various color gradients, as well as images or video (e.g., the VideoBrush provided by MICROSOFT™ WINDOWS™ Presentation Foundation (WPF) and MICROSOFT™ SILVERLIGHT™ 3).

With the rise of the Internet, Hypertext Markup Language (HTML) content has become more and more common both on and off the web. Many standalone applications render their user interfaces or content using HTML or other markup. Because of the sophistication of modern web applications and the potential danger to computer systems caused by running application code from unknown sources, many browsers now offer application sandboxes that restrict or control the types of content that can be displayed in a browser and the manner in which it is displayed. For example, MICROSOFT™ SILVERLIGHT™ allows application developers to perform actions in browsers (such as playing audiovisual content using a variety of codecs) that previously would not be possible due to technical limitations or security restrictions.

Although applications for such sandboxes often operate side by side with HTML that describes a web page, the two have not been able to mix. MICROSOFT™ SILVERLIGHT™ 3 added an out-of-browser feature that allows SILVERLIGHT™ applications to run as standalone desktop applications without a browser (the applications use the browser visual control but appear as desktop applications). There are times when an application developer wants to display HTML content in a SILVERLIGHT™ application that runs outside the browser. The application developer may also want to rotate or apply effects to the HTML content, but still enable the user to interact with the content. Today, this often leads application developers to choose other tools or platforms besides an application sandbox, reintroducing security issues.

SUMMARY

A content display system is described herein that combines the positive attributes of both brushes and web content by allowing web content to be applied as a brush. Existing user interface software code that understands and can use brushes can use the system to include web content in a user interface as easily as any other brush type. The content display system invokes a web host to render web content and captures a static bitmap of the rendered web content. The system stores the bitmap and uses the bitmap as the pixels for a web brush. Applications can use the brush wherever other types of brushes can be used. In some embodiments, the system refreshes brush content under control of the application. Web content provided through a brush is much more versatile than simply compositing web content rendered by a web host with other visuals. Thus, the content display system allows applications to display web content inside an application sandbox or other platform using the familiar form to application developers of a brush.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
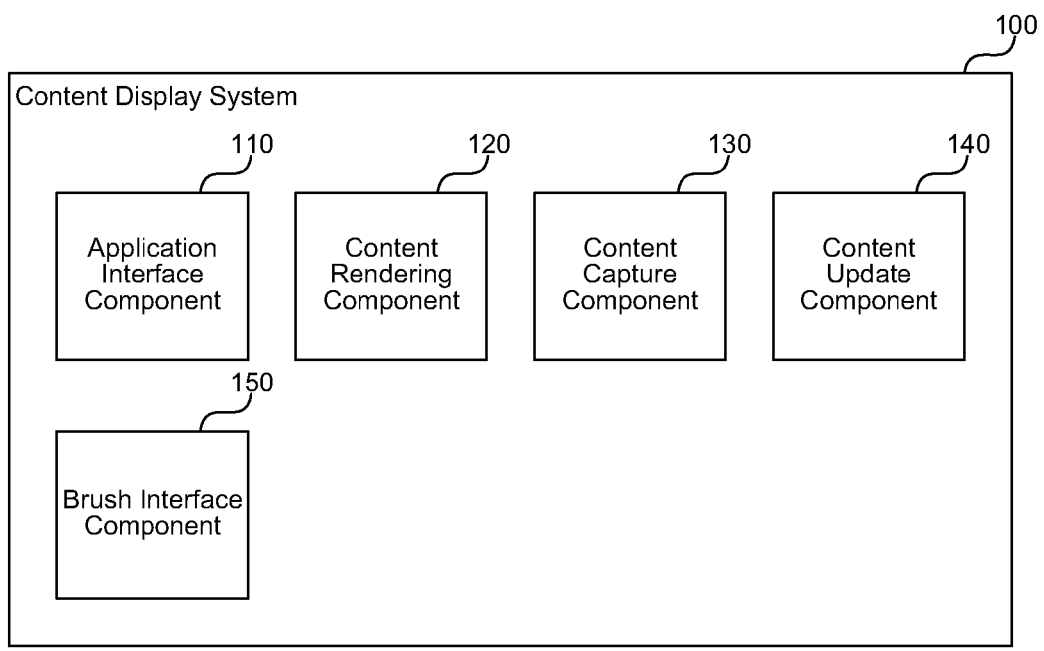
FIG. 1 is a block diagram that illustrates components of the content display system, in one embodiment.

A content display system is described herein that combines the positive attributes of both brushes and web content by allowing HTML and other web content to be applied as a brush. Existing user interface software code that understands and can use brushes can use the system to include web content as easily as any other brush type. In some embodiments, the system is incorporated into an application sandbox platform to allow sandboxed applications to display and transform web content. For example, MICROSOFT™ SILVERLIGHT™ 4 adds WebBrowser and WebBrowserBrush controls to display web content and allow standard transformations over web content (e.g., rotation, opacity). The content display system invokes a web host to render web content and captures a static bitmap of the rendered web content. The system stores the bitmap of the web content and uses the bitmap as the pixels for a web brush. Applications can use the brush wherever other types of brushes can be used, e.g., as the BorderColor to color the frame of a Border element, for the Fill property of a Rectangle or other shape, and so forth. In some embodiments, the system refreshes brush content under control of the application, so that it is possible, for example, to display video from the web inside of the web brush, or even MICROSOFT™ SILVERLIGHT™ or ADOBE™ FLASH™ applications.

Web content provided through a brush is much more versatile than simply compositing web content rendered by a web host with other visuals. Web content may include many types of content, such as HTML, JavaScript, plugins, and so forth. Platforms such as MICROSOFT™ SILVERLIGHT™ can use brushes for properties such as Foreground, Background, Fill, BorderColor, Stroke, and so forth. When an application creates a web brush, the application associates the brush with a web browser user interface element (e.g., the WebBrowser control) that is a source for web content displayed by the brush. This web browser element is not necessarily visible. Either the web brush gets its pixels from the bitmap to which the web browser element renders, or the system requests that the web browser render into the web brush's bitmap. When the web brush has the bitmap, the web brush uses the bitmap to render the parts of any visual elements that have specified that they use the brush for their rendering. The web brush is refreshed, i.e. obtains a new copy of the rendered web content in case anything has changed, under application control. For example, the web brush control may provide a Redraw function that the application can call to request an updated bitmap of the rendered web content. Thus, the content display system allows applications to display web content inside an application sandbox or other platform using the familiar form to application developers of a brush.

In some embodiments, the WebBrowserBrush of MICROSOFT™ SILVERLIGHT™ 4 provides an implementation of the content display system described herein. A WebBrowserBrush is a type of Brush object similar to a VideoBrush. However, instead of painting an area with video content, the WebBrowserBrush paints an area with web (e.g., HTML) content. The web content is provided by a WebBrowser control. Just like other brush types, applications can use a WebBrowserBrush to paint the Fill of a shape (such as a Rectangle), the geometry contents of a Path, the Background of a Canvas, the Foreground of a TextBlock, and other user interface elements that accept brushes. In some embodiments, the web content displayed by the WebBrowserBrush does not update automatically to give the application control of when content is updated. The WebBrowserBrush includes a Redraw method that the application can call to request an updated rendering of the web content.

To use a WebBrowserBrush, an application creates a WebBrowser control and sets its Source property to a web location (e.g., via a Uniform Resource Locator (URL)). The application applies the WebBrowserBrush to an object to be painted, and sets the SourceName property of the WebBrowserBrush to the name of the WebBrowser that the application created. If the content in the WebBrowser changes, the application may call the Redraw method to update the WebBrowserBrush, and when any user interface elements using the brush repaint they will include the updated content. In some embodiments, the user cannot interact with content displayed with a WebBrowserBrush, since that content is only a snapshot of the content rendered by the WebBrowser control. The following example shows how to display content with a WebBrowserBrush. In this example, the content for the WebBrowserBrush is updated after the user moves the mouse.

```
private void LayoutRoot_MouseMove(object sender, MouseEventArgs e)
{
   WBB1.Redraw( );
}
<StackPanel x:Name="LayoutRoot" Background="Blue"
MouseMove="LayoutRoot_MouseMove">
<WebBrowser Name="WB1" Source="Hello.html" Height="150"
Width="150" />
<Rectangle Height="150" Width="150" >
<Rectangle.Fill>
<WebBrowserBrush SourceName="WB1" Opacity=".5"
x:Name="WBB1"/>
</Rectangle.Fill>
</Rectangle>
</StackPanel>
```

FIG. 1 is a block diagram that illustrates components of the content display system, in one embodiment. The system 100 includes an application interface component 110, a content rendering component 120, a content capture component 130, a content update component 140, and a brush interface component 150. Each of these components is described in further detail herein.

The application interface component 110 provides an interface to one or more software applications to interact with the system 100. Through the application interface component 110, applications can request creation of web browser and web browser brush controls, set a source location (e.g., URL) from which to retrieve web content, associate a web browser control with a web browser brush control, associate a web browser brush with one or more user interface elements, and update content displayed by a web browser brush control. The application interface component 110 may provide one or more application programming interfaces (APIs) accessible via one or more software programming languages (e.g., C#, VB.NET, C++) or platforms (e.g., MICROSOFT™ .NET, MICROSOFT™ SILVERLIGHT™) used by the software applications.

The content rendering component 120 renders web content for display. The content rendering component 120 may render the content using web browsing functionality built into an operating system. For example, MICROSOFT™ WINDOWS™ provides MSHTML, SHDOCVW, and other modules that provide HTML parsing and rendering for web content. The content rendering component 120 may render to a visible or a hidden window or region within a window. The content rendering component 120 may receive size information through the application interface component 110 so that web content is appropriately wrapped and scrolled for a display area in which the application plans to display the web content. The content rendering component 120 also receives human interaction (e.g., via mouse, keyboard, or touch). This allows the component 120 to determine which pixels have been clicked and to perform logic based thereon. If the rendered content is not visible (e.g., in a hidden control), then no input is received.

The content capture component 130 captures a snapshot of the rendered web content that represents the content of a brush. The content capture component 130 may use a variety of facilities for capturing bitmap data or another type of snapshot, depending on facilities provided by each operating system, and the facility used may vary based on particular conditions. For example, the way bitmap data can be captured using MICROSOFT™ WINDOWS™ varies based on whether the web browser control is visible or hidden at the time of the capture. If the control is hidden, then the content capture component 130 asks the control to provide a bitmap by calling the OLEDraw API. If the control is visible, then the component 130 can print the rendered web content to a bitmap using the PrintWindow API. On an APPLE™ system, the component 130 uses the drawImageInRect API provided by WebKit to capture a bitmap image.

The content update component 140 handles one or more requests to update rendered web content associated with the brush. The component 140 may receive application requests to update content through the application interface component 110. For example, the application interface may include a Redraw or similar API. Upon receiving a request to update web content, the content update component 140 may invoke the content rendering component 120 to produce an updated rendering of the web content, and the content capture component 130 to capture a new snapshot of the rendered web content. In some embodiments, a web control is continuously updated as web content being rendered by the control changes, and the content update component 140 can invoke the content capture component 130 to capture a new snapshot of the rendered web content.

The brush interface component 150 provides an interface to one or more user interface elements that use brushes to paint one or more attributes of a user interface element. For example, a rectangular region may include a background attribute, fill attribute, or other attributes that can receive a brush that provides the colors, patterns, or other content to use to supply the attribute. Although there are many types of brushes, each adheres to a well-known interface for brushes with which many user interface elements interact. The web brush provided by the content display system 100 described herein exposes an implementation of this interface so that the web brush can be used to paint web content anywhere that other brushes can be used. The particular brush interface may vary based on which operating systems or platforms the system 100 is used, but each platform generally provides a multi-purpose brush interface for using brushes. By exposing web content as a brush, the system 100 simplifies the use of web content and allows web content to be placed easily in areas that would otherwise be programmatically challenging.

The computing device on which the content display system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
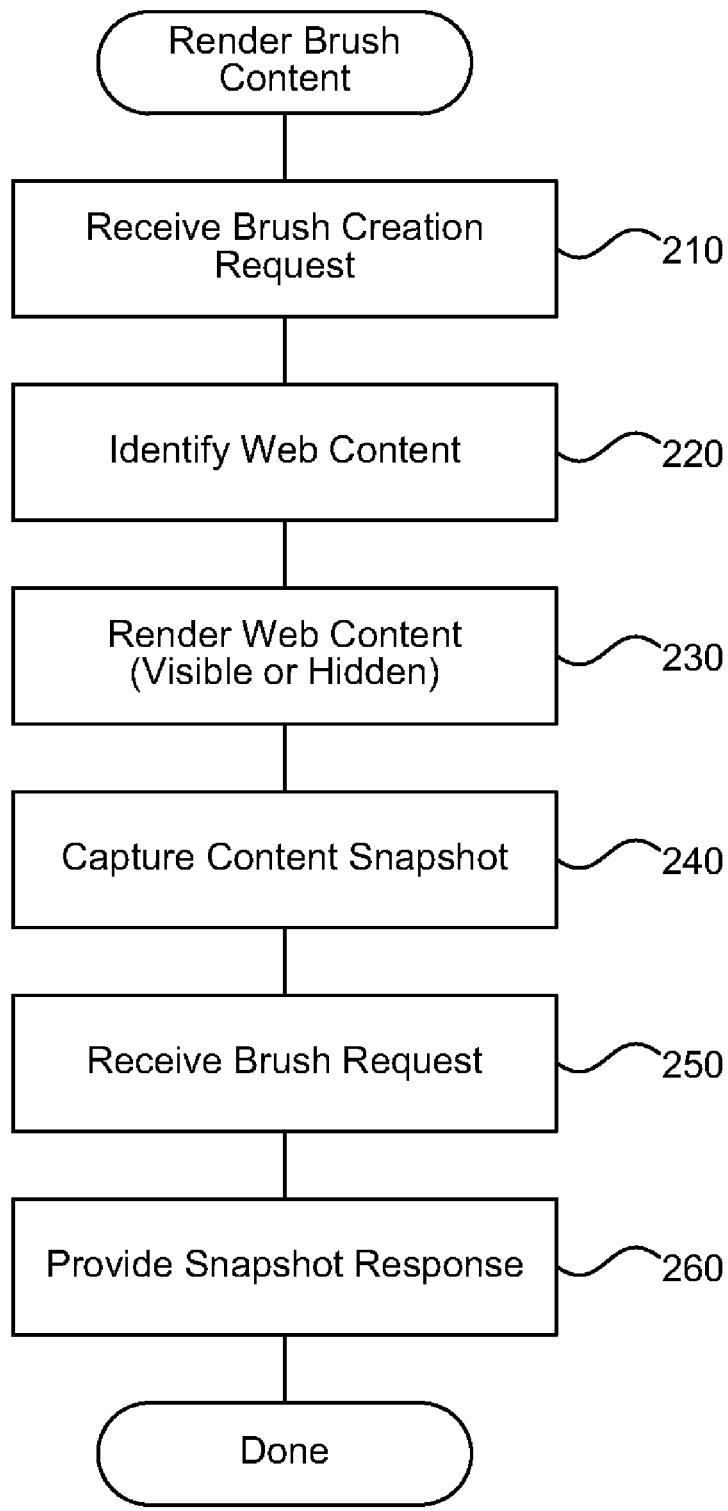
FIG. 2 is a flow diagram that illustrates processing of the content display system to use a web content brush to paint a user interface element, in one embodiment.

FIG. 2 is a flow diagram that illustrates processing of the content display system to use a web content brush to paint a user interface element, in one embodiment. Beginning in block 210, the system receives a request to create a web brush that displays web content. For example, an application may programmatically request creation of a web brush object. The system receives information about the request, creates the brush object, and initializes the object in memory. The web content may be owned by a corresponding web browser control. The web browser control provides a web host for rendering content to be captured. Continuing in block 220, the system identifies web content to be displayed by the web brush. For example, the application may provide a URL or associated web browser control from which the web brush will capture content. The web content may include content stored on the Internet, an intranet, locally on a client computer system, or any other accessible location. Typically, the web content is a web page defined by HTML. In some cases, such as when using MICROSOFT™ SILVERLIGHT™ as the underlying platform, loading local content is prevented to enforce security and browser isolation. The system may also use one or more zones, and only allow applications to display content from the same zone. For example, if the application is from the internet, then the system may allow the application to pull content from the internet but not an intranet.

Continuing in block 230, the system renders the web content. For example, the system may invoke a web browser control to retrieve the identified web content, parse HTML that defines the web content, and display the content according to a layout specified by the HTML. Rendering the web content may include downloading any images or other content associated with the page and displaying those items. In some embodiments, the system renders web content to a hidden window or control, so that a user does not have direct access to the content other than through the locations that use the web brush. In such cases, rendering may occur in memory but not produce an immediately visible result. The system may also receive a size and other properties that are used by a renderer to render the content in accordance with the properties.

Continuing in block 240, the system captures a snapshot of the rendered web content. For example, the system may request that a web browser control that rendered the content provide a bitmap or other type of snapshot of the content or may use a print facility to capture how the rendered web content would appear (whether it is actually visible or not). The snapshot may include all of the rendered content or a specified portion of the content. For example, the system may receive dimensions that specify a size or position over the full web content of the snapshot. The system stores the captured snapshot for later use in response to brush requests.

Continuing in block 250, the system receives a request from a user interface element that paints with a brush for the captured snapshot of the rendered web content. For example, the web brush object may expose an interface or one or more APIs that can be called to request the brush properties, including a bitmap that provides a pattern of the brush. A user interface element uses whatever bitmap a brush provides to paint one or more regions of the user interface element. For example, the brush may be used to paint a foreground, background, sides of a rendered three-dimensional object, and so forth. Typically, the application that creates the brush also provides a user interface that uses the brush, and sets properties of user interface elements to use the brush.

Continuing in block 260, the system provides the captured snapshot of the rendered web content in response to the brush request. The user interface element then paints itself with the provided snapshot. The system may provide the snapshot as a parameter or return value of an API for returning brush content. In some embodiments, the system responds to a brush request by painting itself into a specified region (e.g., using passed in coordinates). After block 260, these steps conclude.

Figure 3:
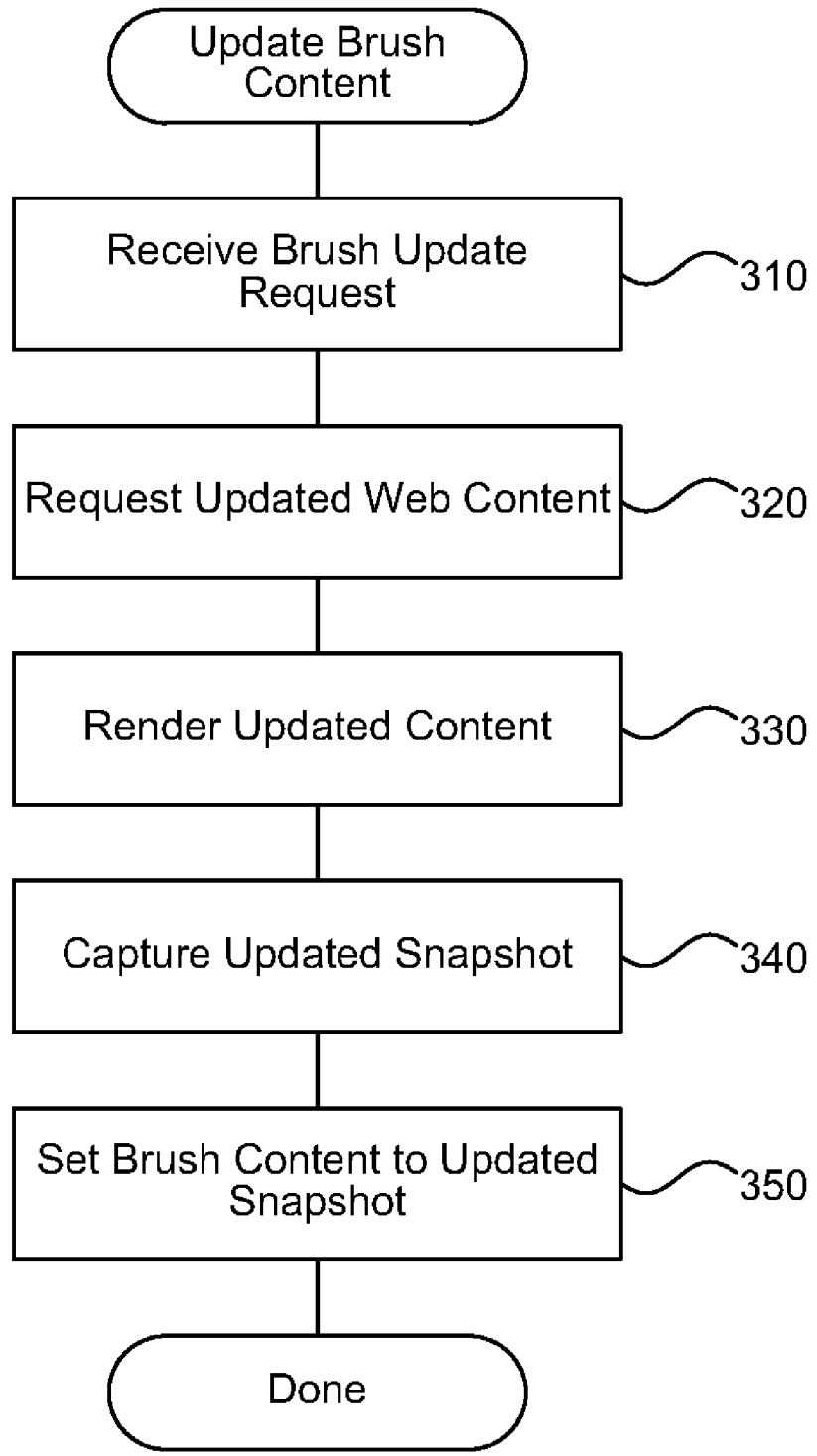
FIG. 3 is a flow diagram that illustrates processing of the content display system to update content of a web content brush, in one embodiment.

FIG. 3 is a flow diagram that illustrates processing of the content display system to update content of a web content brush, in one embodiment. Beginning in block 310, the system receives a request to update web content associated with a web brush that paints the web content onto a region of a user interface element. For example, an application may invoke a function or API for requesting an update (e.g., Redraw) or the system may periodically automatically update. Continuing in block 320, the system requests updated web content from a source of the content. For example, the system may send an HTTP request to a website to retrieve updated web content or request that a web browser control perform the request on behalf of the system.

Continuing in block 330, the system renders received updated web content. For example, the system may parse HTML associated with the content and display a layout specified by the HTML. The rendered content may include images, video, moving elements, and so forth that rendering places at different locations than a previous rendering of the content. For example, a playing video will appear different after several minutes than at the first rendering, a page displaying stock prices or other rapidly changing values will display new values, and so forth.

Continuing in block 340, the system captures an updated snapshot of the rendered web content. For example, the system may capture a bitmap using one or more operating system provided capabilities or facilities for capturing bitmaps of displayed visual content or by asking the web host to export a bitmap. As described previously, the content may not actually be visible, as an application may choose to render web content in a hidden window or control and then capture the content for display using a web brush. This allows the application to control user interaction with the content, as the user will not be able to manipulate the static bitmap of the brush in the same manner as the live web content (e.g., the user may not be able to click on controls on the page, enter text in a form, and so forth).

Continuing in block 350, the system sets the web brush content to the captured updated snapshot. When user interface elements paint with the brush, the elements will use the updated content and the user interface element will have the appearance of the current state of the web content. After block 350, these steps conclude.

Figure 4:
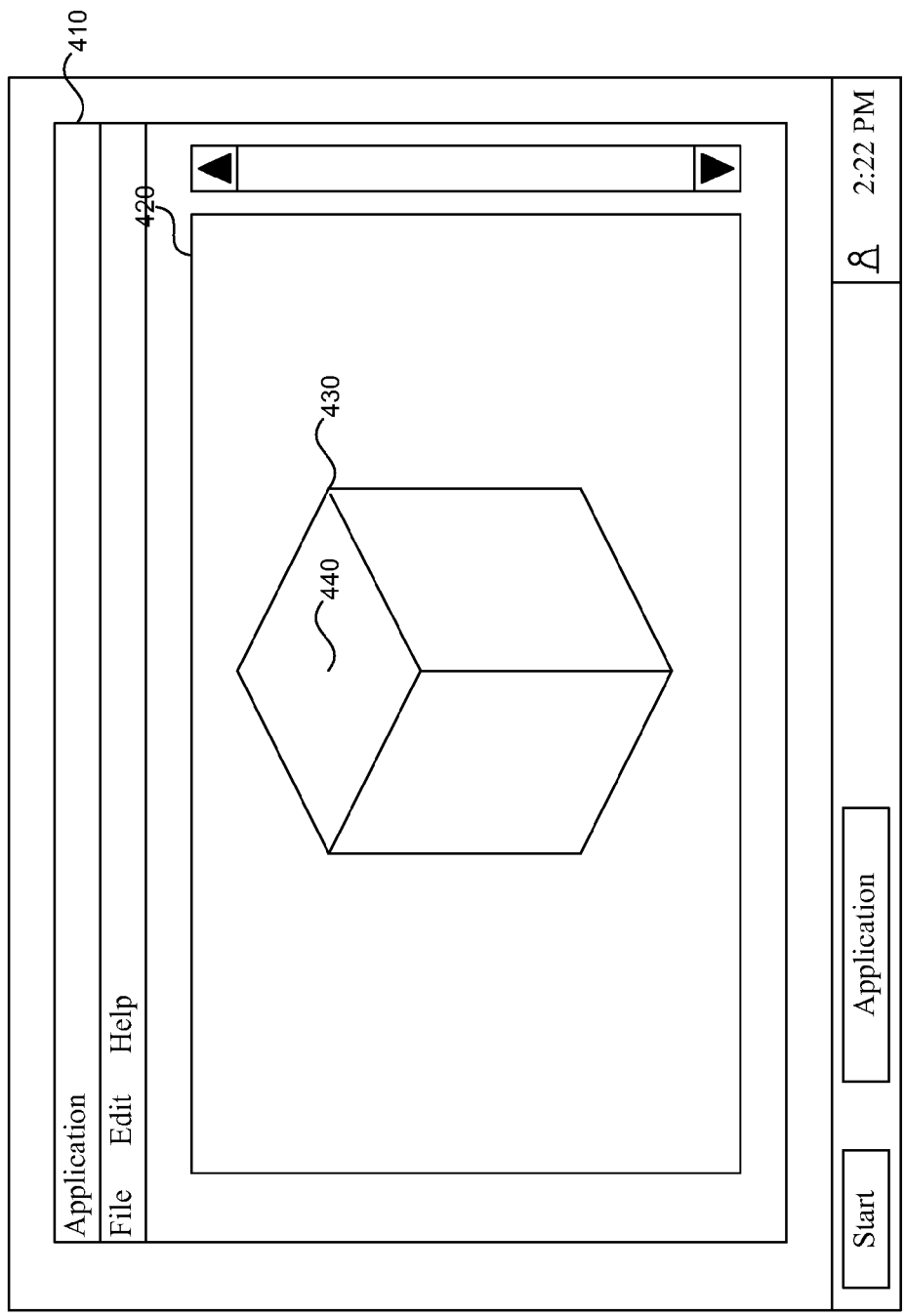
FIG. 4 is a display diagram that illustrates a user interface that includes a user interface element painted with a web content brush, in one embodiment.

FIG. 4 is a display diagram that illustrates a user interface that includes a user interface element painted with a web content brush, in one embodiment. The diagram illustrates an example of painting web content onto the faces of a rendered three-dimensional cube. An application 410 includes a client area 420. The client area 420 displays a three-dimensional cube 430. The cube includes six faces, such as face 440. Assuming each face is made up of a rectangle with a background property that can be painted with a brush, an application developer can display web content on each face 440 of the cube 430, by invoking the content display system to create a web brush and associating one or more web brushes with each face 440 of the cube 430. Doing this without a brush would involve complex three-dimensional rendering. However, with the system described herein the application developer can achieve this result by simply setting up the brush and applying it to the appropriate surfaces.

Operating systems provide various facilities for capturing information from visible and hidden user interface elements. In MICROSOFT™ WINDOWS™ implementations of the system, for example, the manner of capturing information depends on whether the control rendering the web content is hidden or visible. If the control is visible, then the system can leverage the printing facilities of the operating system to capture an image of the rendered content. For example, the system can invoke the PrintWindow API. If the control is hidden, the printing facilities may not work, but the system can ask the control to export a bitmap of its current contents. For example, the system can invoke the OLEDraw API to request an image of the control's current contents. In some embodiments, positioning of the control may affect captured content. For example, the PrintWindow API does not capture off-screen window content. The content display system may move a window into the on-screen area, capture a snapshot, and move the window back to capture all of the content. These steps can be performed quickly so that the user does not perceive the movement.

In APPLE™ Mac OS X™ implementations, the content display system can leverage the drawImageInRect API provided by WebKit to capture bitmap image data. Cocoa provides a WebView similar to the web control available for MICROSOFT™ WINDOWS™ that can render web-based content. The content display system requests that the WebView draw itself into a bitmap to capture the bitmap image for the web brush. The system can specify a size for the area to render into, so that the dimensions match any specified by an application using the brush. In some embodiments, the system works around operating system or control limitations to capture the bitmap image. For example, for web plugins that do not render to unknown views (e.g., ADOBE™ FLASH™), the system may place a WebView into an invisible window to capture the bitmap. As another example, the system may set window attributes to avoid overlapping views (or to inform the operating system that views do not overlap) to capture the bitmap.

In some embodiments, the content display system allows transforms to be applied to content painted with a web brush. For example, opacity settings can affect content rendered with the web brush so that application developers can make web content transparent or semi-transparent and overlaid (e.g., alpha blended) over other content. Other transforms can also be applied to the content, such as stretching, rotating, and so forth. Transforming the brush content affects the brush content wherever the brush is used to paint a surface.

In some embodiments, the content display system allows application developers to display content on top of web content. As an example, when web content is normally displayed, the application developer is stuck with whatever menus are provided by the web browser. The application developer may want to display his own context menu or other visual elements over the web content. By using a web brush, the application owns the area on which the web content is painted, and can display various visual elements over the painted web content.

In some embodiments, the content display system captures rendered web content in multiple tiles. In some cases, content is not rendered in a layout that can be easily captured all at once by the system. For example, displayed web content may be large, off-screen, positioned so that scrolling bars are visible, or in other conditions for which the system may capture the content in portions. The system can request a bitmap of each region of the rendered content. For example, the system may establish a 3×3 grid over the content, capture the content in nine separate tiles, and then stitch the content back together into one captured bitmap to use for the web brush.

In some embodiments, the content display system prevents low security applications from reading screen pixels. Malicious applications often use pixel-reading features to avoid Digital Rights Management (DRM) or to carry out other undesirable exploits. The system can prevent applications that are untrusted from using the web brush to extract pixel data related to content displayed on a web page, such as a movie protected by DRM. This prevents applications from capturing and saving pixel data. The system may allow elevated security applications to read pixels.

In some embodiments, the content display system watermarks displayed web content. For example, the system may apply a watermark to web content when the brush is used along with full screen web content. When applications display full screen content, users can be fooled into thinking that they are using the operating system or other applications when they are really using the full screen application. To prevent the user from being fooled, the system can display a watermark over full screen web content that signals the user that she is seeing application content rather than operating system content.

From the foregoing, it will be appreciated that specific embodiments of the content display system have been described herein for purposes of illustration, but that various modifications may be made without deviating from the spirit and scope of the invention. Accordingly, the invention is not limited except as by the appended claims.

We claim:

1. A computer-implemented method for exposing web content through a user interface brush, the method comprising:
   receiving a request to create a web brush that displays web content, wherein web content is a web page available from the internet and wherein the web brush is a programmatic data type that can used by application program code to paint the content of the brush on a rendered surface;
   identifying web content to be displayed by the web brush;
   rendering the web content to prepare the content for display;
   capturing a snapshot of the rendered web content;
   receiving a request from a user interface element that paints with a brush for the captured snapshot of the rendered web content; and
   providing the captured snapshot of the rendered web content in response to the brush request,
   wherein the preceding steps are performed by at least one processor.

2. The method of claim 1 wherein receiving the request to create the web brush comprises receiving a programmatic request to create a web brush object, and creating the web brush object in response.

3. The method of claim 1 wherein identifying web content comprises receiving a Uniform Resource Locator (URL) that identifies a source of web content.

4. The method of claim 1 wherein rendering the web content comprises invoking a web browser control to retrieve the identified web content, parse Hypertext Markup Language (HTML) that defines the web content, and display the content according to a layout specified by the HTML.

5. The method of claim 1 wherein rendering the web content comprises downloading any images or other content associated with the web content and displaying those items.

6. The method of claim 1 wherein rendering the web content comprises rendering the web content to a hidden window, wherein a user does not have direct access to the content other than through the user interface element using the web brush.

7. The method of claim 1 wherein rendering the web content comprises receiving a size that defines a region for which to render the web content.

8. The method of claim 1 wherein capturing the snapshot comprises requesting that a web browser control that rendered the content provide a bitmap of the content.

9. The method of claim 1 wherein capturing the snapshot comprises invoking an operating system print facility to capture an appearance of the web content.

10. The method of claim 1 wherein capturing the snapshot comprises storing the captured snapshot for later use in response to brush requests.

11. The method of claim 1 wherein receiving the request comprises invoking an interface of a web brush object that represents the web brush to request a bitmap that provides a pattern of the brush.

12. The method of claim 1 wherein the user interface element paints at least some of a displayed area with the captured snapshot of the rendered web content.

13. A computer system for displaying web content using a graphical user interface brush, the system comprising:
   a processor and memory configured to execute software instructions;
   an application interface component configured to provide an interface to one or more software applications to interact with the system;
   a content rendering component configured to render web content for display, wherein web content is a page available from the internet;
   a content capture component configured to capture a snapshot of the rendered web content to use as content of a web brush, wherein the web brush is a programmatic data type that can used by application program code to paint the content of the brush on a rendered surface; and
   a brush interface component configured to provide an interface to one or more user interface elements that use brushes to paint one or more attributes of the user interface elements.

14. The system of claim 13 wherein the application interface component is further configured to provide application programming interfaces (APIs) for creating a web browser control, creating a web brush control, setting a source location from which to retrieve web content, associating the web browser control with the web browser brush control, associating a web browser brush with one or more user interface elements, and updating content displayed by the web browser brush control.

15. The system of claim 13 wherein the content rendering component is further configured to receive size information through the application interface component and render content based on the received size information.

16. The system of claim 13 wherein the content capture component is further configured to interface with operating system provided capabilities for capturing bitmap content to capture the snapshot.

17. The system of claim 13 further comprising a content update component configured to handle one or more requests to update rendered web content associated with the brush.

18. The system of claim 17 wherein, upon receiving a request to update web content, the content update component invokes the content rendering component to produce an updated rendering of the web content, and the content capture component to capture a new snapshot of the rendered web content.

19. A computer-readable storage medium comprising instructions for controlling a computer system to update web content provided by a brush, wherein the instructions, upon execution, cause a processor to perform actions comprising:
   receiving a request to update web content associated with a web brush that paints the web content onto a region of a user interface element, wherein web content is a web page available from the internet and wherein the web brush is a programmatic data type that can used by application program code to paint the content of the brush on a rendered surface;
   requesting updated web content from a source of the content;
   rendering received updated web content;
   capturing an updated snapshot of the rendered web content; and
   setting the web brush content to the captured updated snapshot, so that the user interface element that paints with the web brush will display the updated snapshot of the web content.

20. The medium of claim 19 wherein receiving a request to update web content comprises detecting that an application invoked an application programming interface (API) for redrawing the content of the web brush.

* * * * *